Aug. 5, 1958  F. L. WEAVER  2,846,245
OIL DEFLECTOR FOR SHAFT SEAL WITH FORCED VENTILATION
Filed July 9, 1954  3 Sheets-Sheet 3

Inventor
Firm L.Weaver
by  Kiess
His Attorney

United States Patent Office 2,846,245
Patented Aug. 5, 1958

2,846,245

OIL DEFLECTOR FOR SHAFT SEAL WITH FORCED VENTILATION

Firm L. Weaver, Lynnfield Center, Mass., assignor to General Electric Company, a corporation of New York Application July 9, 1954, Serial No. 442,315

4 Claims. (Cl. 286—10)

This invention relates to oil seals for bearings of high speed rotors and the like, particularly to an oil deflector assembly for a steam turbine bearing incorporating a forced ventilation system for preventing the transfer of heat to the bearing from adjacent high temperature parts, and for "pressurizing" the oil seal to resist outward leakage of oil and oil vapor.

As the temperatures employed in steam turbines have progressively increased above 700° F., it has become very important to insulate the shaft bearings against the transfer of heat from adjacent high temperature turbine casing parts. Without such protection, it is found that heat conducted and radiated from the hot turbine parts causes the lubricating oil to carbonize and the resulting carbon to build up on cooperating rotating parts, to such an extent that parts may be mechanically scored and the balance characteristics of the rotor seriously disturbed.

Accordingly, an object of the present invention is to provide an improved heat shield and oil deflector assembly for a shaft bearing oil seal, with special means for both creating a positive pressure zone to resist outward leakage of oil, and also removing heat from the shaft and cooperating parts before it can reach the bearing and oil reservoir, certain parts of the forced ventilating system also forming a radiation shield serving as a heat barrier between the bearing and adjacent hot turbine parts.

A further object is to provide an air-cooled oil deflector assembly of the type described involving comparatively simple parts, and requiring no substantial increase in the axial space required for the shaft seal assembly.

Figure 1:
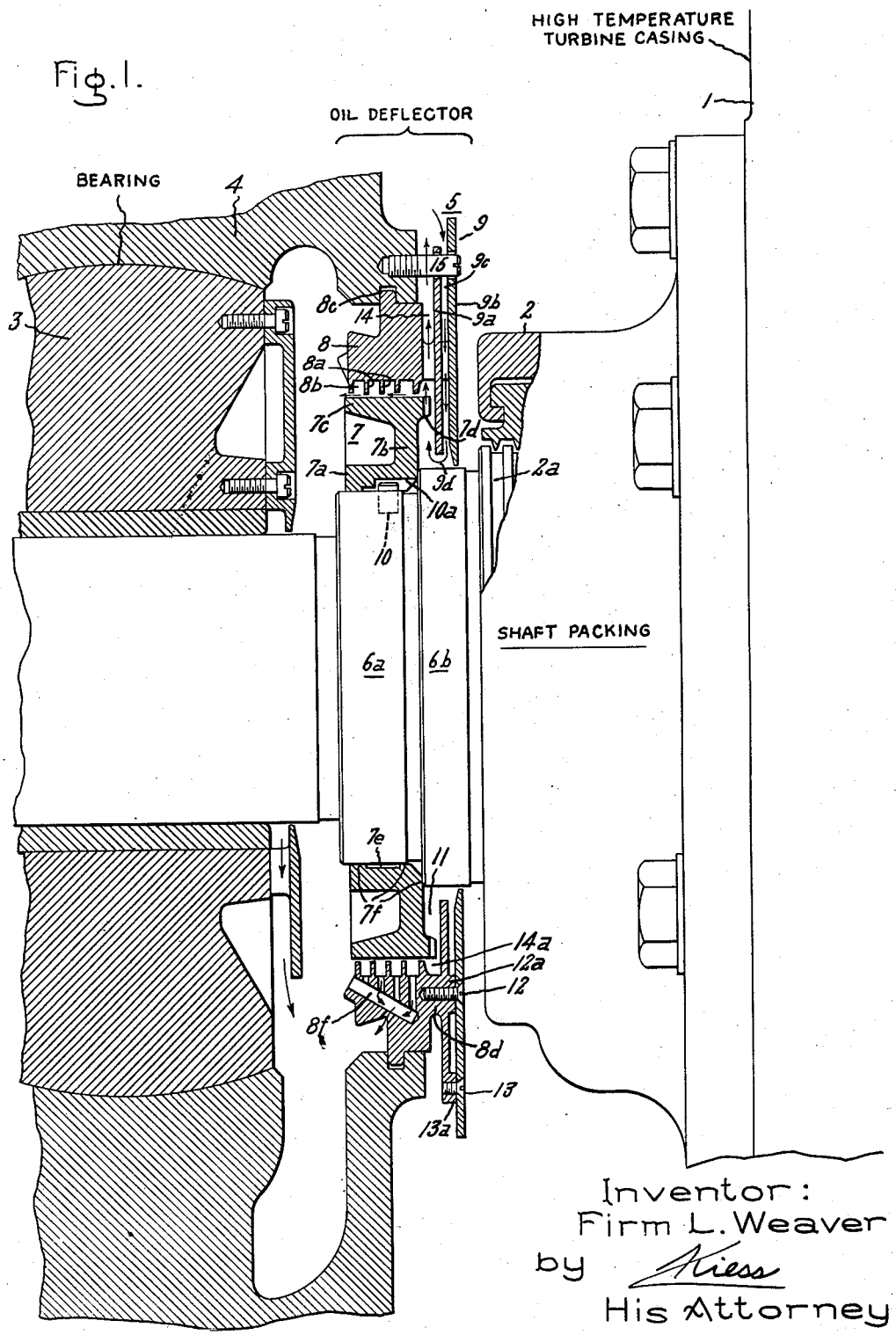
Figure 2:
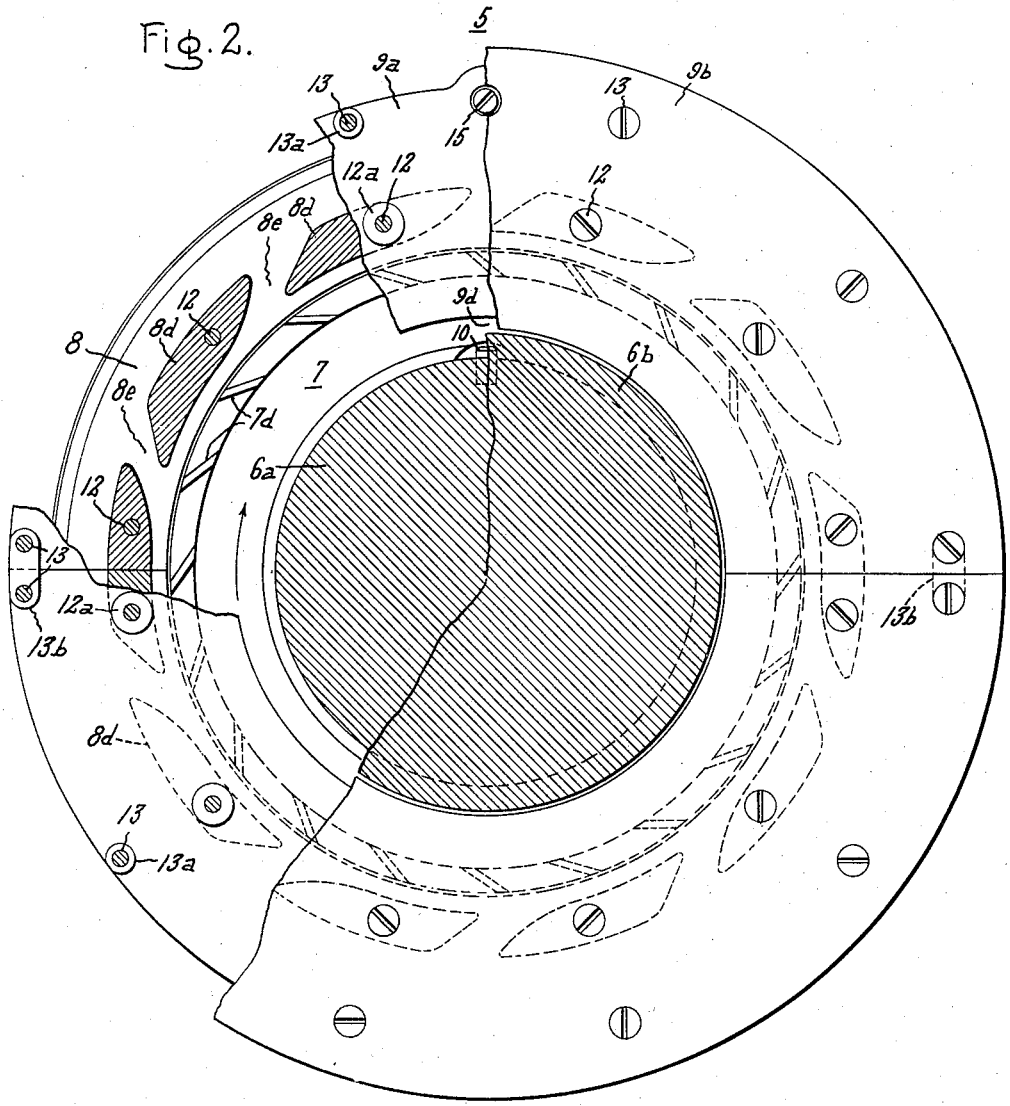
Figure 3:
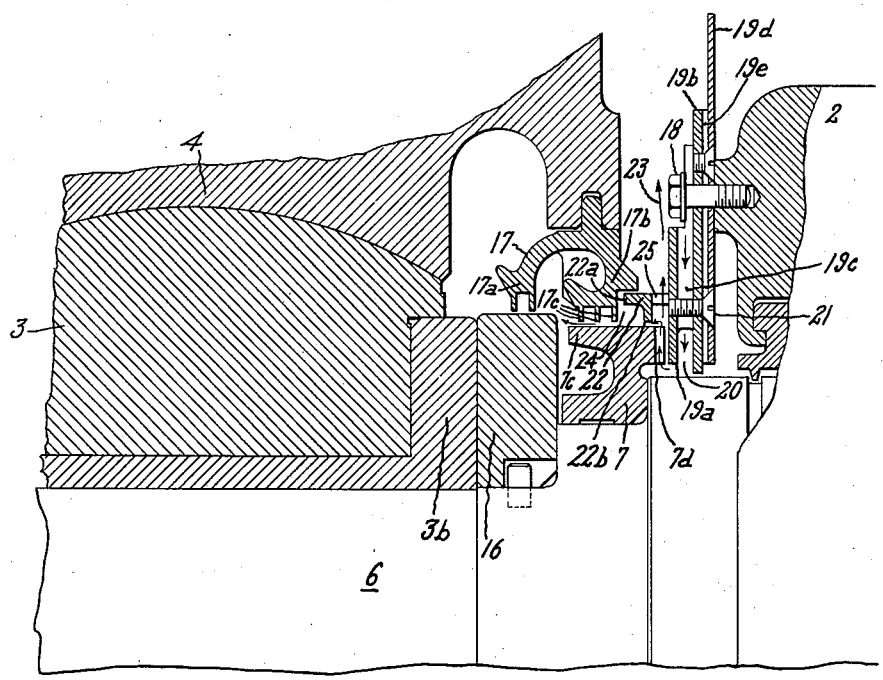

Other objects and advantages will become apparent from the following description, taken in connection with the accompanying drawings in which Fig. 1 is a longitudinal sectional view of a high temperature turbine shaft bearing and oil seal assembly incorporating the invention;

Fig. 2 is a partial view, in section, illustrating details of the parts which comprise the forced ventilation system; and Fig. 3 is a partial section illustrating alternate construction details of a ventilated oil deflector assembly incorporating the invention.

Generally stated, the invention is practiced by providing a multiple radiation shield between the oil seal and adjacent hot parts, with a centrifugal impeller to circulate cooling air over the shield members and create a pressure zone at the exterior side of the oil seal.

Referring now more particularly to Fig. 1, the invention is illustrated as applied to a steam turbine, only a portion of the high temperature casing being shown at 1, to which is bolted a steam packing assembly 2 of conventional construction. A portion of a conventional journal bearing is shown in section at 3. It will be appreciated by those familiar with the art that bearing 3 is supported by a suitable pedestal or housing member 4 which is separated mechanically and thermally from the high temperature turbine casing 1 so as to prevent the conduction of heat from the turbine through the pedestal to the bearing. The special air-cooled oil deflector assembly to which the invention particularly relates is illustrated generally at 5.

It will be seen that the turbine rotor has a shaft end portion 6 supported in the journal bearing 3, a somewhat larger diameter shoulder portion 6a, and a still larger shoulder portion 6b immediately adjacent the steam seal grooves 2a. The ventilated oil seal assembly proper comprises a rotating seal ring member 7, a stationary seal ring assembly 8 supported in the bearing housing 4, and a multiple radiation shield assembly indicated generally at 9.

Generally stated, the stationary seal member 8 cooperates with rotating seal ring 7 to form the principal oil seal, the radiation shield assembly 9 constitutes a barrier to the transfer of heat from the hot turbine casing to the bearing housing 4, and the member 7 has portions shaped to pump cooling air through the radiation shield and to build up a pressure at the exterior side of the shaft seal to prevent leakage of oil outwardly. How these functions are performed will be seen in more detail from the following.

The seal member 7 is a continuous ring pressed or shrunk on the shaft shoulder portion 6a. It will be seen that this ring actually comprises a hub portion 7a, a comparatively thin web portion 7b, and a rim portion 7c. The major portion of the rim 7c defines a circumferential surface of substantial axial extent and adapted to cooperate with the multiple sealing teeth 8a defined by circumferential grooves 8b machined in the stationary seal member 8. It will be appreciated that member 8 must be formed in two or more segments, which are supported in bearing housing 4 by a circumferential tongue and groove joint shown at 8c. It will also be understood that the oil sealing teeth 8a define circumferential clearance spaces with the exterior surface of rim 7c which are as small as practicable consistent with available manufacturing processes. The exterior end portion of the rim member 7c is machined to define centrifugal pump vanes 7d.

The design of the ring member 7 is specially adapted to reduce the transfer of heat, travelling by conduction along the shaft, from the heated portions of the turbine rotor to the oil seal member 8. It will be obvious from a consideration of Fig. 1 that excessive thermal expansion of the ring 7 would tend to close up the clearances defined with the seal teeth 8a and create danger of rubbing. Any resulting wear on the teeth 8a would tend to enlarge the clearances and increase the oil leakage. Therefore, keeping the ring 7 at a comparatively low temperature facilitates maintaining close clearances between rim 7c and the seal teeth 8a, so oil leakage can be minimized. It will also be obvious that, if the ring 7 should be permitted to heat to a temperature sufficient to cause carbonization of the oil leaking along the outer surface of rim 7c, the resulting carbon would build up in the clearances defined with the teeth 8a and cause scoring of the outer surface of rim 7c. Such scoring would of course increase the leakage path for the oil and might eventually disturb the very precise balance required for the turbine rotor.

The design features by which the flow of heat from the shaft to the oil seal member 8 is obstructed are as follows. In the first place, it will be observed that the inner periphery of hub portion 7a has a cutaway portion defining a small recess 7e with the shaft. This annular recess reduces the metal-to-metal contact between hub portion 7a and the shaft portion 6a, leaving only the three comparatively small annular portions identified 7f. Thus the conduction of heat from the rotor shaft to the ring 7 is kept to a minimum. Furthermore, the web portion 7b is made of the minimum axial thickness required to support the mechanical stresses imposed by reason of centrifugal force acting on the rim portion 7c. It will be obvious in Fig. 1 that this web portion 7b is comparatively thin relative to the axial length of the hub and rim portions. This thin web provides a minimum heat transfer path between the hub 7a and the rim 7c.

Besides the shrink or press fit between the hub 7a and the shaft portion 6a, the ring member 7 may be secured by any suitable key means, such as the radially disposed dowel pin shown at 10, the projecting end portion of the dowel engaging a keyway 10a in the hub 7a.

The multiple radiation shield assembly 9 comprises a first annular plate member 9a spaced axially from a second annular plate 9b to define a cooling air inlet passage 9c. It will be apparent that the inner periphery of plate 9b defines a minimum annular clearance space with the shaft portion 6b, while plate 9a defines a comparatively large annular clearance identified 9d. It will also be seen that the radially inner portion of plate 9a cooperates with the adjacent web portion of ring 7 to define an annular chamber 11, to which cooling air is admitted through the annular inlet 9d. The shield assembly is supported in axially spaced relation to the ring 7 and ring 8 to define coolant passages 11 and 14, respectively. For convenience, the passages 9c, 9d will be referred to as the "coolant inlet passages," while the passages 11, 14 will be referred to as "coolant discharge passages."

By comparison of Figs. 1 and 2, it will be seen that the plates 9a and 9b are fabricated in at least two sections and secured to the oil seal member 8 by a plurality of threaded fastenings 12. A suitable spacer member 12a maintains the desired spacing between plates 9a, 9b. A second circumferential row of threaded fastenings 13 secure together the outer circumferential portions of plates 9a, 9b, with a suitable spacer portion 13a therebetween. The respective sections of the plates may be secured together by a special separate elongated spacer member shown at 13b in Fig. 2, arranged to bridge the joint between plate sections.

As shown in the lower portion of Fig. 1, the fastening members 12 are threadedly received in oil seal ring member 8, which has axially extending boss portions 8d serving as spacers to support the plate assembly 9a, 9b so as to define the cooling air discharge passage 14. By reference to Fig. 2, it will be observed that the boss portions 8d have an exterior contour shaped to define diffusing passages 8e for the cooling air discharged by the centrifugal impeller blades 7d. The direction of rotation of the centrifugal impeller is as indicated by the arrow in Fig. 2.

Oil travelling along the surface of rim 7c is thrown off into the annular chambers 8b defined between teeth 8a, and is drained back into the bearing housing by a series of inter-communicating drain holes, identified generally at 8f, as indicated by the flow arrows in the lower half of Fig. 1.

In order to prevent the assembly comprising the oil seal ring 8 and the attached plate members 9a, 9b from rotating in the tongue and groove joint 8c, a dowel 15 is threadedly received in the adjacent portion of bearing housing 4 and projects freely through openings in the plates, as will be apparent from a comparison of Figs. 1 and 2.

The flow of cooling air through the annular inlet passage 9c, through the annular inlet 9d into the impeller chamber 11, thence through the discharge passage 14 is indicated by the flow arrows in Fig. 1. It is to be particularly noted that the impeller 7d builds up a substantial positive pressure in the annular chamber 14a located immediately adjacent the exterior end of the leakage path along the circumference of rim portion 7c. This positive pressure tends to create a small flow of air inwardly past the seal teeth 8a, as indicated by the small arrows in the upper half of Fig. 1. This small flow of air resists the outward leakage of oil and oil vapor.

It will now be seen how this forced ventilation arrangement limits the transfer of heat from the hot turbine parts to the oil seal members 7, 8. The plates 9a, 9b define a double radiation shield resisting transfer of heat by radiation from the hot turbine casing 1 to the rings 7, 8 and bearing 4. Heat radiated from the casing to the plate 9b is removed by the flow of cooling air through the inlet passage 9c before it can be transferred to the other plate 9a. Plate 9a is cooled by the flow of cooling air over both its surfaces, and by reason of this cooling air flow, the plates 9a, 9b form a particularly effective radiation shield.

The above-described design features of ring 7 reduce to a minimum the conduction of heat through the shaft and through the ring member 7 to the shaft seal teeth 8a. Furthermore, the flow of cooling air through the chamber 11 and past the centrifugal impeller blades 7d serves to directly cool the web portion 7b and the rim portion 7c, the impeller vanes 7d serving as very effective "cooling fins." Thus, any small amount of heat transferred to ring 7 by conduction from the shaft is effectively removed by the cooling air before it has a chance to raise the temperature of the rim portion 7c.

It is also to be noted that the flow of cooling air through the annular inlet 9d into chamber 11 produces a direct cooling effect on the shaft portion 6b so as to reduce the conduction of heat axially to the left along the shaft to the bearing parts.

Thus, the invention provides an extremely effective combination of features resisting the transfer of heat from the high temperature turbine parts to the bearing and oil seal parts, without necessitating the use of expensive or complex additional parts and without requiring any substantial increase in the axial dimension of the space required to house the oil seal members and related parts.

It will of course be appreciated by those familiar with apparatus of the class described that many alterations in mechanical design and substitution of equivalents may be made without departing from the invention. For instance, one modified construction for the radiation shield assembly is illustrated in Fig. 3, in which members analogous to those in Fig. 1 carry like reference numerals.

Fig. 3 shows an annular thrust collar 16 suitably keyed to the shaft 6 and engaging a thrust bearing member 3b. The seal ring member 7 is identical to that shown in Fig. 1. The stationary seal ring 17 has two axially spaced portions 17a, 17b with seal teeth forming close clearances with the outer circumference of thrust ring 16 and with the external surface of ring 7, respectively. The principal difference from the structure of Fig. 1 is that the radiation shield assembly is carried on the shaft packing housing 2 by means of threaded fastenings 18. This assembly comprises spaced annular plates 19a, 19b separated by suitable spacer members 19c to form the inlet passage 20. This assembly may of course be formed as separate members secured together by the threaded fastenings 21. To reduce the transfer of heat from packing housing 2 to the plate 19b, an extra plate member 19d may be disposed adjacent housing 2, with radially extending ribs or spacer portions 19e reducing the metal-to-metal contact area between 19d and 19b.

The air discharge passage from the centrifugal impeller blades 7d is defined by a ring member 22, which is of L-shaped cross section, and is supported from the radiation shield plate 19a by a plurality of spacers 25 secured to or formed integral with the plate 19a and ring 22, respectively. One leg 22a forms a clearance as small as practicable with the adjacent circumferential portion of packing member 17. The other leg 22b forms a somewhat larger circumferential clearance with the outer surface of rim portion 7c. With this arrangement, the impeller blades 7d discharge a major portion of the cooling air as indicated by arrow 23. The discharge pressure built up by the impeller 7d causes a small flow of air through the clearance defined by ring portion 22b into the annular chamber 24. The pressure thus built up in chamber 24 causes a small flow of air inwardly past the sealing teeth 17c, as described above in connection with Fig. 1.

Thus, the invention provides comparatively simple means for resisting the transfer of heat from the adjacent hot turbine casing to the lubricating oil and bearing and shaft seal parts, while at the same time providing very effective means for cooling the critical portions of the oil seal in order that minimum clearances may be maintained, without the danger of rubbing or deposition of carbonized oil particles in such clearances.

While only two modifications of the invention have been described specifically herein, it is of course intended that the appended claims cover all such modifications as fall within the true spirit and scope of the invention.

What I claim as new and desire to secure by Letters Patent of the United States is:

1. A ventilated shaft seal assembly for a high temperature rotor comprising a rotor portion carrying a first rotating seal ring member having a radially extending web portion of small axial thickness to limit the conduction of heat therethrough and a rim portion of an axial length substantially greater than the thickness of said web portion, a second stationary seal ring member disposed around said first ring member and having portions defining at least one small circumferential clearance space constituting an axial leakage path along the outer surface of said first ring member, a radiation shield assembly disposed adjacent and spaced axially from said first and second seal ring members to define a coolant discharge passage and including at least two annular plate members axially spaced from each other to define therebetween a first coolant fluid inlet passage, the radiation shield plate nearest the seal ring members defining a substantial annular clearance space with the rotor to form a second coolant passage, the second radiation shield plate adjacent said first plate defining a small circumferential clearance space with the rotor to restrict to a minimum the leakage of coolant therethrough, said first seal ring member having a circumferential end portion forming a centrifugal impeller radially adjacent said leakage path for inducing a flow of coolant through said first inlet passage and said second coolant passage, the impeller discharging the coolant through said coolant discharge passage and across the adjacent surface of said first radiation shield plate and creating a pressure zone at the exterior end of said leakage path to resist flow of fluid therethrough toward the radiation shield assembly.

2. A ventilated shaft seal assembly comprising a rotor including a first rotating seal ring member having a radially extending web portion of small axial thickness to limit the conduction of heat therethrough and a circumferential rim portion, a second annular stationary seal member disposed around said first ring member and defining therewith at least one small axially extending radial clearance space, a shield assembly disposed adjacent and spaced axially from said first seal ring member to define a coolant discharge passage and including at least two annular plate members spaced axially to define therebetween a first coolant fluid inlet passage, the shield plate nearest the seal ring member defining a substantial annular clearance space with the rotor to form a second coolant passage, the other shield plate defining a small clearance space with the rotor to restrict to a minimum the leakage of coolant therethrough, centrifugal impeller means carried on the rotor radially adjacent said clearance space for inducement of a flow of coolant through said first inlet passage and through said second coolant passage, coolant discharged by said centrifugal impeller means through said coolant discharge passage being directed across the adjacent surface of said first shield plate and creating a pressure zone adjacent said radial clearance space whereby leakage of fluid through said radial clearance space toward the shield assembly is resisted.

3. A ventilated shaft seal assembly comprising a rotor member having a radially extending portion of small axial thickness to reduce conduction of heat therethrough and a circumferential rim with centrifugal fan means associated with one end portion thereof, shaft seal means surrounding said rim and defining therewith a first small axially extending annular clearance space for limiting the leakage of fluid therethrough, a multiple radiation shield assembly disposed adjacent and spaced axially from said radial rotor portion to define a coolant discharge passage and including a first annular plate member adjacent the centrifugal fan means and having an inner circumferential portion defining a substantial radial clearance space with the adjacent circumferential portion of the rotor, and a second plate member defining a small clearance space with the rotor to restrict to a minimum the leakage of coolant therethrough, said second plate member being disposed adjacent said first plate and spaced axially therefrom to define a coolant fluid inlet passage whereby the centrifugal fan means induces a flow of coolant fluid through said inlet passage and the radial clearance space between said first plate and the rotor, whereby the shield assembly and adjacent portions of the rotor are cooled and the coolant fluid discharged from the centrifugal fan means flows through said coolant discharge passage and across an adjacent surface of the first plate member and creates a pressure zone adjacent said first annular clearance space to resist the flow of leakage fluid through said clearance space toward the shield assembly.

4. A ventilated shaft seal assembly in accordance with claim 3 having spacer means between the first annular shield plate member and the shaft seal means, the external contour of said spacer members being shaped to define coolant fluid diffusing passages between adjacent spacers.

References Cited in the file of this patent

UNITED STATES PATENTS

| 1,310,672 | Sherbondy | July 22, 1919 |
| 1,562,019 | Wilkinson | Nov. 17, 1925 |
| 2,414,840 | Streid | Jan. 28, 1947 |